(12) United States Patent
Wang et al.

(10) Patent No.: US 8,742,243 B2
(45) Date of Patent: Jun. 3, 2014

(54) METHOD AND APPARATUS FOR MELODY RECOGNITION

(75) Inventors: Wen-Nan Wang, Cingshuei Township, Taichung County (TW); Jyh-Shing Jang, Taipei (TW); Tzu-chun Yeh, Taoyuan (TW); Chung-Che Wang, Huwei Township, Yunlin County (TW); Hsin-Wen Yu, Yilan (TW); Cheng-Yu Hsu, Taipei (TW)

(73) Assignee: Institute for Information Industry, Taipei (TW)

( * ) Notice: Subject to any disclaimer, the term of this patent is extended or adjusted under 35 U.S.C. 154(b) by 413 days.

(21) Appl. No.: 13/160,750

(22) Filed: Jun. 15, 2011

(65) Prior Publication Data
US 2012/0132056 A1 May 31, 2012

(30) Foreign Application Priority Data

Nov. 29, 2010 (TW) ................................ 99141179 A

(51) Int. Cl.
*A63H 5/00* (2006.01)
*G04B 13/00* (2006.01)
*G10H 7/00* (2006.01)

(52) U.S. Cl.
USPC .......................................................... 84/609

(58) Field of Classification Search
USPC ................................................... 84/609, 618
See application file for complete search history.

(56) References Cited

U.S. PATENT DOCUMENTS

| 7,518,052 | B2 * | 4/2009 | Kourbatov | 84/609 |
| 7,838,755 | B2 * | 11/2010 | Taub et al. | 84/609 |
| 7,919,706 | B2 * | 4/2011 | Tsui et al. | 84/618 |
| 8,084,677 | B2 * | 12/2011 | Wilder | 84/609 |
| 8,101,842 | B2 * | 1/2012 | Lee et al. | 84/609 |
| 2003/0023421 | A1 * | 1/2003 | Finn et al. | 704/1 |
| 2007/0276656 | A1 | 11/2007 | Solbach et al. | |
| 2008/0190272 | A1 * | 8/2008 | Taub et al. | 84/645 |

FOREIGN PATENT DOCUMENTS

| CN | 101398827 A | 4/2009 |
| CN | 101657817 A | 2/2010 |
| JP | 2007-328288 A | 12/2007 |

* cited by examiner

*Primary Examiner* — Jeffrey Donels
(74) *Attorney, Agent, or Firm* — Birch, Stewart, Kolasch & Birch, LLP

(57) ABSTRACT

The present disclosure provides a method for recognition. The method includes inputting a melody and obtaining pitch tracking information of the melody; obtaining beat information of the melody; determining a clarity value according to the pitch tracking information; implementing a first comparison process first to filter a first set of candidate songs from a database and then implementing a second comparison process to filter a second set of candidate songs from the first set of candidate songs if the clarity value is larger than a predetermined threshold; and determining at least one final candidate song from the second set of candidate songs.

19 Claims, 3 Drawing Sheets

METHOD AND APPARATUS FOR MELODY RECOGNITION

CROSS REFERENCE TO RELATED APPLICATIONS

This Application claims priority of Taiwan Patent Application No. 099141179, filed on Nov. 29, 2010, the entirety of which is incorporated by reference herein.

BACKGROUND OF THE INVENTION

1. Field of the Invention

The invention relates to melody recognition.

2. Description of the Related Art

Conventionally, pitch and the pitch vector of pitch are used as the basic in melody recognition methods. In prior art, for melody recognition technology, a melody database of pitch information of a plurality of songs is first established. After a user hums a melody, pitch information of the hummed melody is captured, such as pitch and the pitch vector of pitch, and then the pitch information is compared with the melody database for getting possible corresponding songs based on comparisons.

Some known technologies not only compare pitch information but also use additional methods such as inputting of text information or lyrics of songs to improve accuracy rate of recognition. However, when a melody doesn't accurately be hummed by a user, the result of the comparison between the hummed melody and the melody database will easily be inaccurate, and therefore the success rate of recognition will decrease especially when a user hums out of tune.

BRIEF SUMMARY OF THE INVENTION

In view of this, the invention provides a method for melody recognition, comprising: inputting a melody; obtaining pitch tracking information of the melody; obtaining beat information of the melody; determining a clarity value of the melody according to the pitch tracking information; implementing a first comparison process first to filter a first set of candidate songs from a database and then implementing a second comparison process to filter a second set of candidate songs from the first set of candidate songs if the clarity value is larger than a predetermined threshold; and determining at least one final candidate song from the second set of candidate songs.

An embodiment of the invention provides an apparatus for melody recognition, comprising: a receiver, receiving a melody; a processor, obtaining pitch tracking information and beat information of the melody and determining a clarity value of the melody according to the pitch tracking information; and a comparator, comparing the melody with a database according to the clarity value; wherein if the clarity value is larger than a predetermined threshold, the comparator first implements a first comparison process to filter a first set of candidate songs from the database, and then the comparator implements a second comparison process to filter a second set of candidate songs from the first set of candidate songs, wherein the comparator determines at least one final candidate song from the second set of candidate songs.

An embodiment of the invention provides a computer program product loaded by an electronic apparatus to execute a method for melody recognition, comprising: a first code, receiving a melody; a second code, obtaining pitch tracking information of the melody; a third code, obtaining beat information of the melody; a fourth code, determining a clarity value of the melody according to the pitch tracking information; a fifth code, implementing a first comparison process first to filter a first set of candidate songs and then implementing a second comparison process to filter a second set of candidate songs if the clarity value is larger than a predetermined threshold; and a sixth code, determining at least one final candidate song from the second set of candidate songs.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In prior art, melody recognition methods conventionally utilize pitch and the total length of pitch to recognize melodies. However, beats of songs is also an important feature. If tunes of two melodies are similar but the beats are different, the two melodies may not be the same song. Therefore, if a recognition method is able to combine pitch information and beat information for recognize melodies, it may be more effective. Moreover, the problem of decreased recognition success rate due to out of tune humming may be solved by the recognition method which combines pitch information and beat information to recognize melodies.

Figure 1A:
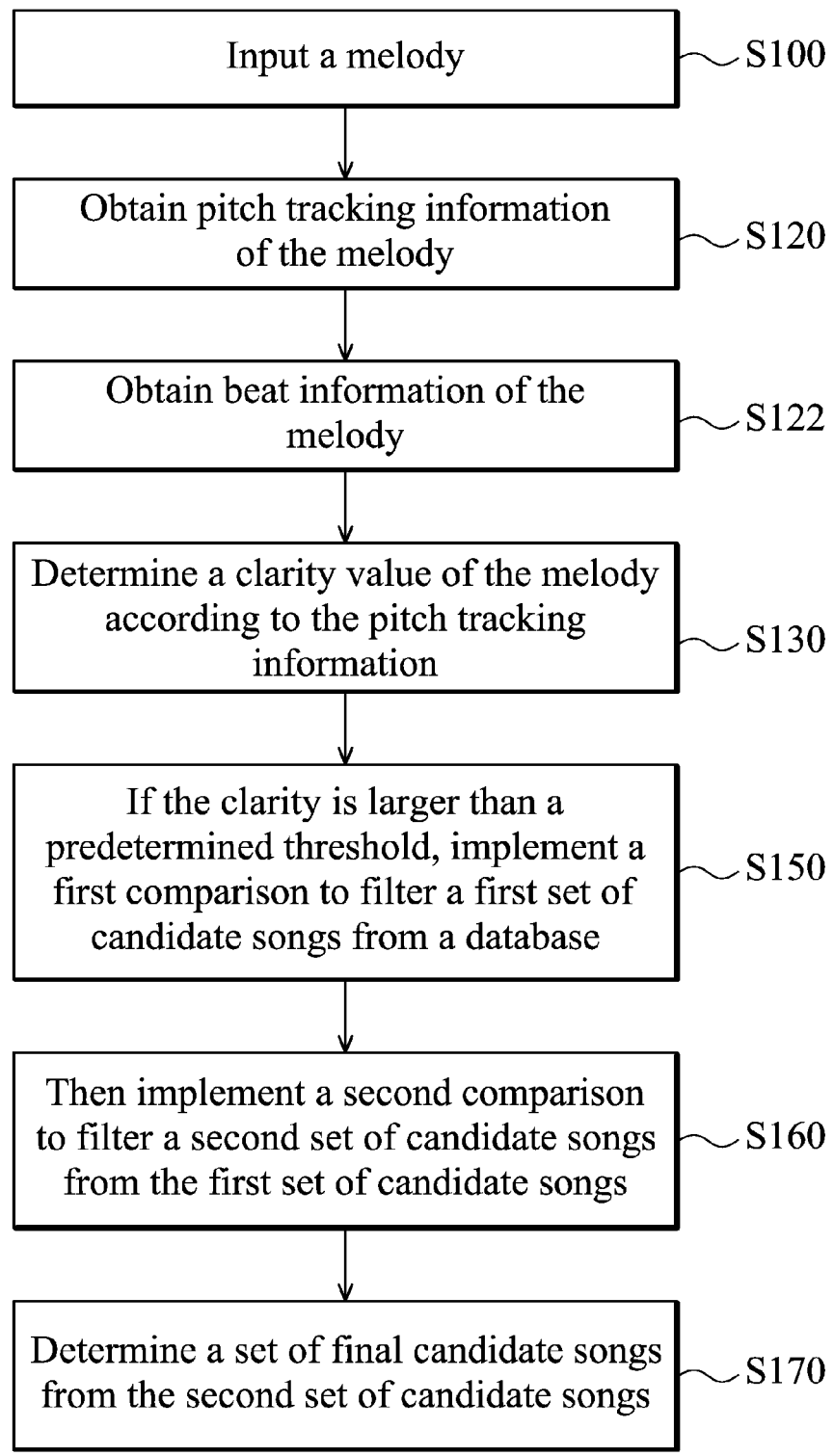
FIG. 1A illustrates a flow chart of a method for melody recognition in accordance with an embodiment of the invention.

FIG. 1A illustrates a flow chart of a method for melody recognition in accordance with an embodiment of the invention. Step S100 is inputting a melody. In one embodiment, a melody can be input by a user who hums or sings through a microphone. This melody hummed or sung by the user has to be sampled properly so as to transform the melody into an audio signal file.

Step S120 obtains pitch tracking information of the melody. For example, pitch tracking is implemented on the melody to obtain the pitch tracking information. Related technologies about pitch tracking will be described later.

Step S122 obtains beat information of the melody. For example, onset detection is implemented on the melody to obtain the beat information. Related technologies about onset detection will be described later.

Step S130 determines a clarity value of the melody according to the pitch tracking information. For example, the pitch tracking information is normalized to obtain the clarity value. Related technologies about the clarity value will be described later.

In step S150, if the clarity value is larger than a predetermined threshold, a first comparison process is implemented to filter a first set of candidate songs from a database. The first comparison process can be a pitch vector comparison. Pitch vector comparison is taken as an example in this embodiment, but the first comparison process is not limited to being a pitch vector comparison. Related technologies about pitch vector comparison will be described later.

Step S160 implements a second comparison process to filter a second set of candidate songs from the first set of candidate songs. The second comparison process is a comparison which is different from the first comparison process. For example, if the first comparison process is a pitch vector comparison, the second comparison process can be a beat comparison. But the second comparison process is not limited to being a beat comparison. Related technologies about beat comparison will be described later.

Step S170 determines at least one final candidate song according to the second set of candidate songs. For example, top 10 candidate songs are outputted for a user's reference.

Figure 1B:
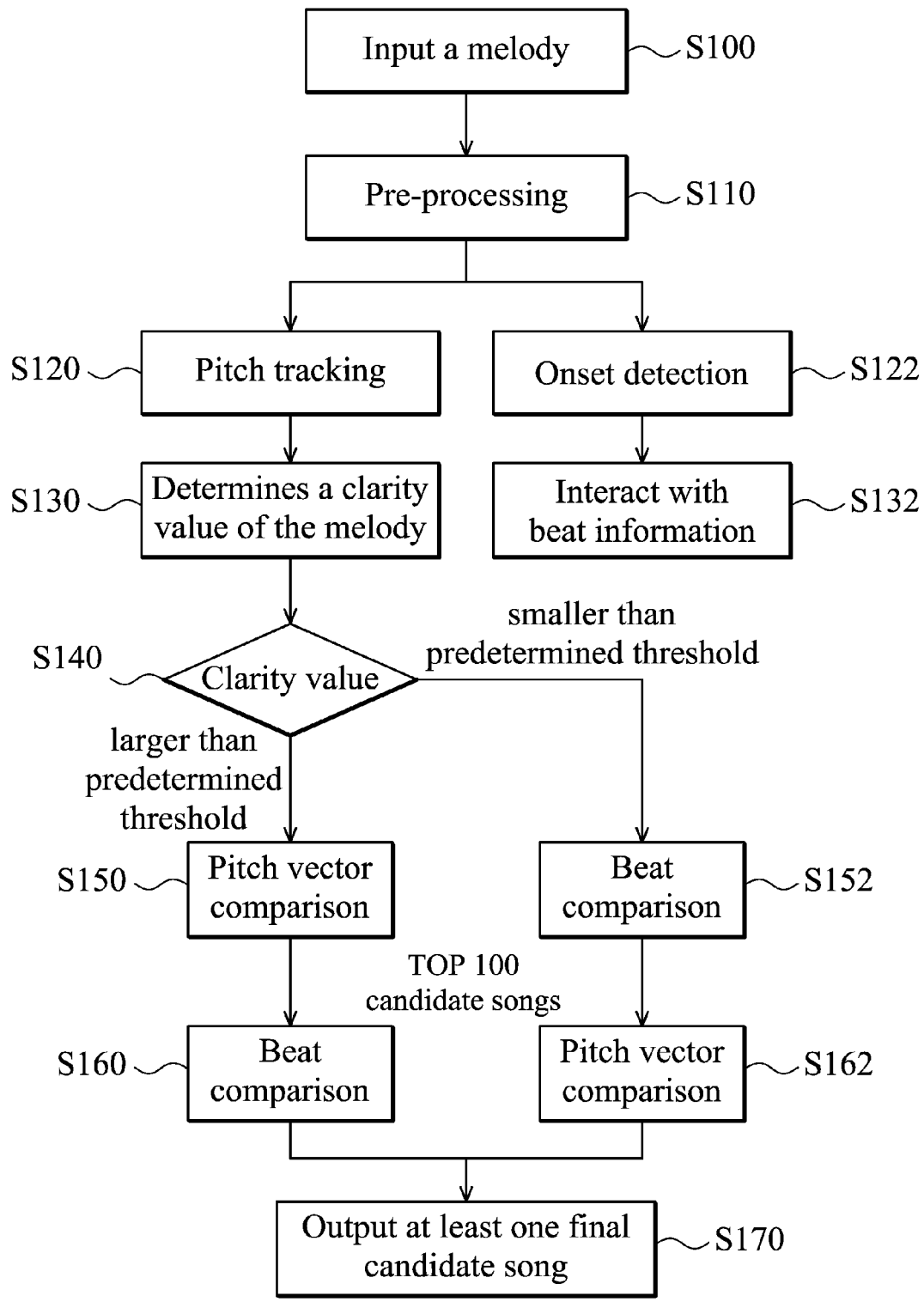
FIG. 1B illustrates a flow chart of a method for melody recognition in accordance with another embodiment of the invention.

FIG. 1B illustrates a flow chart of a method for melody recognition in accordance with another embodiment of the invention. The steps in FIG. 1B that are the same as those in FIG. 1A are titled with the same reference numbers.

Step S100 is inputting a melody.

Step S110 pre-processes the melody. The pre-processed processes are pretreatments required in normal audio signal processing, including end-point detection, pre-emphasis, frame segmentation, etc. End-point detection determines which section in audio signals is a voiced/unvoiced section, or a noise section. Pre-emphasis is designed to deal with distortion caused by digitizing signals in a high frequency band. Frame segmentation is used to separate the audio signal file into a plurality of audio frames with a fixed time period wherein audio frames can overlap.

After pre-processing the melody, step S120 and step S122 implement pitch tracking and onset detection on the pre-processed melody to obtain pitch tracking information and beat information, respectively. In some embodiments, an auto-correlation function (ACF) can be used for pitch tracking. The value of the auto-correlation function at time t in an audio frame s is:

$$ACF(t) = \sum_{i=0}^{n-1-t} s(i) * s(i+t),$$

wherein s(i) is the value of the audio frame s at the i-th time point, and n is the number of sampling points in the audio frame (i=0~n−1). If s(i) and s(i+t) are more similar, the inner-product of s(i) and s(i+t) is bigger. Therefore, finding positions where ACF(t) has maximum values can be used to obtain periods of audio signals and then frequencies and pitches of audio signals.

In some other embodiments, an average magnitude difference function (AMDF) can be used for pitch tracking. The value of the auto-correlation function at time t in an audio frame s is:

$$AMDF(t) = \sum_{i=0}^{n-1} |s(i) - s(i-t)|.$$

AMDF is similar to ACF, but AMDF(t) calculates the sum of the absolute values of s(i) subtracted by s(i−t). If values of s(i) and s(i−t) are closer, the value of AMDF(t) is smaller. Therefore, finding positions where AMDF(t) has minimum values can be used to obtain periods of audio signals and then frequencies and pitches of audio signals.

As described above, pitch tracking uses ACF or AMDF to obtain pitch tracking information (values of ACF or AMDF). Then the method determines pitch value of every audio frame according to the pitch tracking information and transforms all pitch values of the melody into a pitch vector. The pitch vector is a vector composed of a series of pitch values of audio frames.

Step S122 is onset detection. In one embodiment, step S122 uses phase deviation to perform onset detection and records a corresponding time of onset points so as to calculate beat information. In another embodiment, step S122 uses spectral flux to perform onset detection and records a corresponding time of onset points so as to calculate beat information.

Step S130 determines the clarity value of the melody according to the pitch tracking information. The clarity value can be obtained by normalizing the pitch tracking information. Taking ACF as example, the formula of the clarity value is as following:

$$\text{clarity value} = \frac{2 \sum_{i=0}^{n-1-t} s(i) * s(i+t)}{\sum_{i=0}^{n-1-t} s^2(i) + \sum_{i=0}^{n-1-t} s^2(i=t)}.$$

Calculated as described above, the clarity value is limited to [1,−1]. Usually, the sample points in the audio frame have the better periodicity if the clarity value of the audio frame is higher. That is, the more accurate the calculated pitch value is. If a curve of clarity values formed from audio frames of the melody is smooth and stable, it is much more possible that the melody is a humming or singing melody. If a curve of clarity values versus audio frames of the melody is not smooth and not stable, it is possible that the melody is a breathy section or non-voice section.

Step S140 decides whether the first comparison process is implemented first or the second comparison process is implemented first according to the clarity value. In one embodiment, if the clarity value is larger than a predetermined threshold, it means that the information of the inputted melody hummed or sung by user is complete. That is, implementing pitch vector comparison can have good accuracy. Therefore, the first comparison process is implemented before the second comparison process. That is, pitch vector comparison is implemented in step S150 first and then beat comparison is implemented in step S160. If the clarity value is smaller than the predetermined threshold, it means that the information of the inputted melody hummed or sung by user is inaccurate or in disorder. That is, implementing beat comparison can have higher accuracy. Therefore, the second comparison process is implemented before the first comparison process. That is, beat comparison is implemented in step S152 first and then pitch vector comparison is implemented in step S162. The predetermined threshold described above can be set or adjusted according to experience and experimental results.

In one embodiment, the predetermined threshold is that in 250 audio frames the number of audio frames that have clarities larger than 0.5 is at least 201. Therefore, if there are 50 audio frames out of 250 audio frames of a melody having clarity values smaller than 0.5, it means that the input information of the melody is in disorder. So beat comparison is implemented in step S152 first and then pitch vector comparison is implemented in step S162.

In one embodiment, after a first-stage comparison in step S150 or S152, a first set of candidate songs or a third set of candidate songs, corresponding to step S150 and S152 respectively, is filtered according to results of the first-stage comparison. For example, the first set of candidate songs and the third set of candidate songs can be TOP 100 candidate songs. Then a second set of candidate songs is filtered from the first set of candidate songs or a fourth set of candidate songs is filtered from the third set of candidate songs, corresponding to step S160 and S162 respectively, by a second-stage comparison in step S160 or S162. The TOP 10 candidate songs can be filtered from the TOP 100 candidate songs in this embodiment.

For example, in the first comparison process (ex: Step S150), a first estimating score of each of all songs in a database is calculated according to first comparison process results. The first comparison process chooses the TOP 100 candidate songs according to the first estimating scores of all the songs. In the second comparison process (ex: Step S160), a second estimating score of each of the TOP 100 candidate songs is calculated according to the second comparison process results. Then the TOP 10 candidate songs are filtered from the TOP 100 candidate songs according to the second estimating scores of the TOP 100 candidate songs. In the end, a merged estimating score of each of the TOP 10 candidate songs is provided for a user's reference, wherein the merged estimating score of a song is a combination of the first estimating score and the second estimating score of the song with a weighted ratio. If the clarity value is larger than the predetermined threshold, the weighted ratio of the first estimating score is higher than the weighted ration of the second ratio. If the clarity value is smaller than the predetermined threshold, the weighted ratio of the second estimating score is higher than the weighted ratio of the first ratio. For example, if the clarity value is larger than the predetermined threshold, weighted ratio of the first estimating score can be 0.6 and weighted ratio of the second estimating score can be 0.4. That is, the merged estimating score=(first estimating score×0.6)+ (second estimating score×0.4). If the clarity value is smaller than the predetermined threshold, weighted ratio of the first estimating score can be 0.4 and weighted ratio of the second estimating score can be 0.6. The higher a merged estimating score of a song is, the more similar the song and input melody are.

Pitch vector comparison in steps S150 and S162 compares the pitch vector of the melody obtained from step S120 with pitch vector information of all songs in the database, wherein pitch vector information of all songs in the database is stored in a pitch corpus. In one embodiment, the candidates using in the pitch vector comparison are obtained by a linear scaling algorithm by means of interpolation. For example, a scaling factor can range from 0.5 to 2.0, and a step for the scaling factor can be 0.1. Therefore, 16 versions of the original pitch vector are obtained. Then the pitch vector comparison compares the 16 versions of the original pitch vector with each song in the database to obtain 16 distances of the melody to each song in the database, wherein 16 distances corresponds to 16 versions of the original pitch vector. That is, each song in the database has 16 distances. The minimum distance of 16 distances is converted to a first estimating score corresponding to the song. The smaller the minimum distance is, the higher the corresponding first estimating score is. If the minimum distance of a song in the database is smaller, it means that the song and the melody are similar. In another embodiment, pitch vector comparison can utilize a dynamic time warping algorithm.

Beat comparison in steps S152 and S160 compares the beat information of the melody obtained from step S122 with beat information of each of all songs in the database, wherein beat information of all songs in the database is stored in a beat corpus. In the beat comparison, the beat information of the melody and beat information of all songs in the database are converted into inter onset intervals (IOI) and are normalized. Then the IOI of the melody is compared with the IOI of each of all songs in the database according to a method based on dynamic programming so as to obtain a distance of the IOI of the melody to the IOI of each song in the database. The distance can be converted into a second estimating score. The smaller the distance is, the higher the corresponding second estimating score is, and that is, the more similar the melody and the song are. In another embodiment, beat comparison can utilize an earth mover's distance (EMD) algorithm.

After the second-stage comparison, step S170 determines at least one final candidate song from the second set of candidate songs or the fourth set of candidate songs. For example, step S170 can choose a song whose comparison result is the most similar, according to the second/fourth set of candidate songs, to be a final candidate song. Or step S170 can choose the top 3 or 10 songs whose comparison results are the most similar to be a final set of candidate songs for a user's reference.

Moreover, in step S132, after recording the user's voice, an interactive device can play user's voice and perform interactions according to the beat information of user input melody obtained from the onset detection in step S122 by means of a pre-set light pattern or actions of the interactive device. The interactive device can be an electronic doll, virtual pets, robots, etc.

Also, one embodiment of the invention includes a training process which prepares the pitch corpus and the beat corpus. The pitch corpus stores the pitch vector information of each song and the beat corpus stores beat information of each song.

Figure 2:
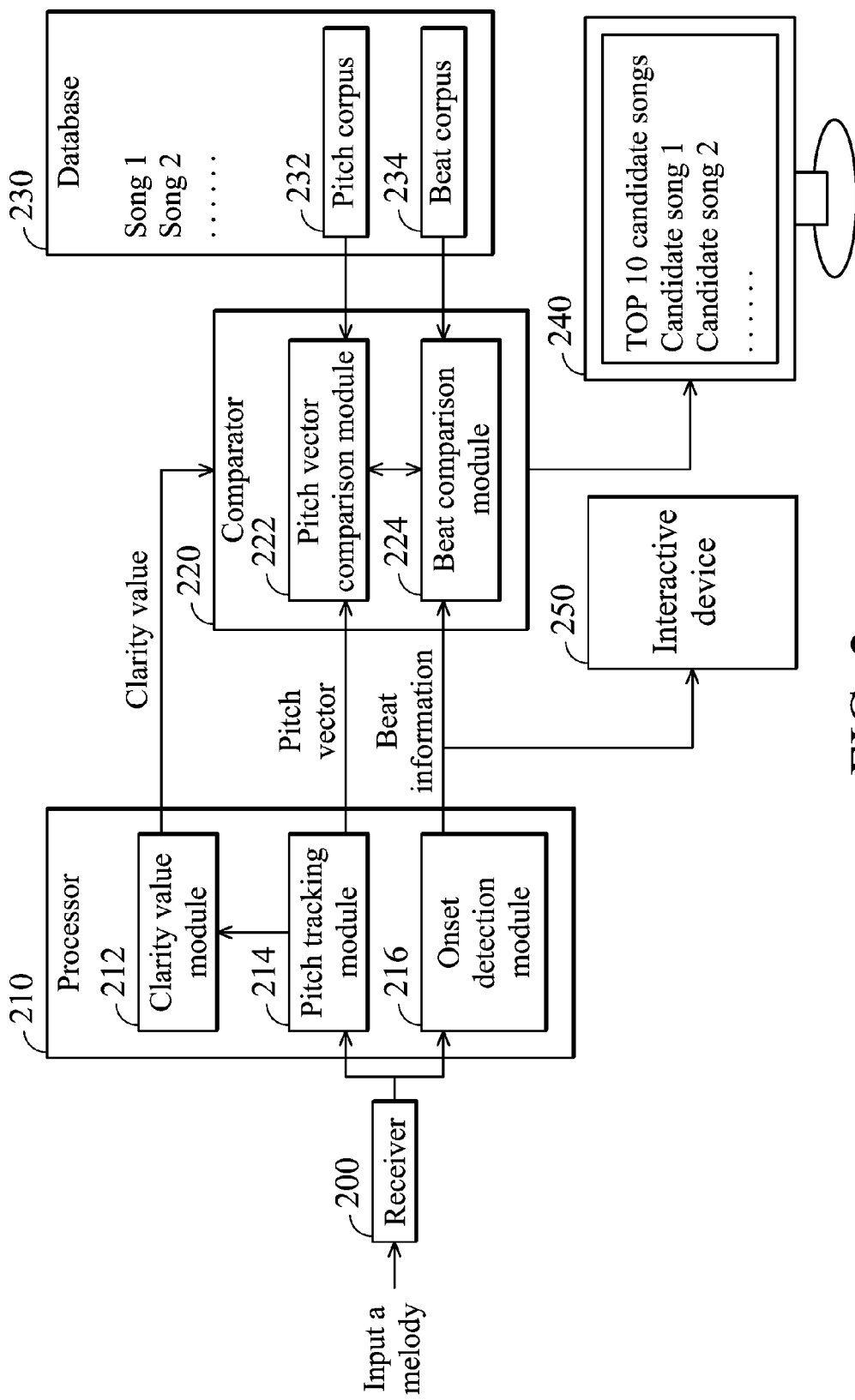
FIG. 2 illustrates a block diagram of an apparatus for melody recognition in accordance with an embodiment of the invention.

FIG. 2 illustrates a block diagram of an apparatus for melody recognition 20 in accordance with an embodiment of the invention. A receiver 200 receives a melody. The receiver 200 can be a microphone or similar devices. The receiver 200 transmits the melody to a processor 210. The processor 210 obtains pitch vector information and beat information of the melody and determines a clarity value of the melody according to the pitch vector information.

The processor 210 includes a clarity value module 212, pitch tracking module 214, and onset detection module 216. The pitch tracking module 21 uses ACF or AMDF to obtain the pitch tracking information (values of ACF or AMDF) of the melody. Then the pitch tracking module 21 obtains pitch value of each audio frame according to the pitch tracking information and transforms all pitch values of the melody into a pitch vector. The pitch vector is a vector composed of a series of pitch values of audio frames. The onset detection module 216 uses phase deviation or spectral flux to perform onset detection and records corresponding time of onset points so as to calculate beat information. The clarity value module 212 normalizes the pitch tracking information to obtain the clarity value and transmits the clarity value to a comparator 220.

The comparator 220 compares the melody with a database 230 according to the clarity value. If the clarity value is larger than a predetermined threshold, pitch vector comparison is first implemented by a pitch vector comparison module 222 of the comparator 220 to filter such as the TOP 100 candidate songs from the database 230. Then beat comparison is implemented by a beat comparison module 224 of the comparator 220 to filter such as the TOP 10 candidate songs from the TOP 100 candidate songs. If the clarity value is smaller than the predetermined threshold, beat comparison is first implemented by the beat comparison module 224 of the comparator 220 to filter such as the TOP 100 candidate songs from the database 230. Then pitch vector comparison is implemented by the pitch vector comparison module 222 of the comparator 220 to filter such as the TOP 10 candidate songs from the TOP 100 candidate songs. A display device 240 displays the TOP 10 candidate songs.

Pitch vector comparison compares the pitch vector of the melody with pitch vector information of all songs in the database 230. Pitch vector information of all songs in the database 230 is stored in a pitch corpus 232. Beat comparison compares the beat information of the melody with beat information of all songs in the database 230. Beat information of all songs in the database 230 is stored in a beat corpus 234.

The apparatus for melody recognition 20 further includes an interactive device 250. After recording the user's voice, the interactive device 250 can play user's voice and perform interactions according to the beat information of user input melody obtained from the onset detection by means of a pre-set light pattern or actions of the interactive device while playing the user's voice. The interactive device 250 can be an electronic doll, virtual pets, robots, etc.

A embodiment of the invention further provides a computer program product loaded by an electronic apparatus to execute a method for melody recognition, comprising: a first code, receiving a melody; a second code, obtaining pitch tracking information of the melody; a third code, obtaining beat information of the melody; a fourth code, determining a clarity value of the melody according to the pitch tracking information; a fifth code, implementing a first comparison process first to filter a first set of candidate songs and then implementing a second comparison process to filter a second set of candidate songs if the clarity value is larger than a predetermined threshold; and a sixth code, determining at least one final candidate song from the second set of candidate songs.

In one embodiment, the computer program product further comprises: a seventh code, implementing the second comparison process first to filter a third set of candidate songs and then implementing the first comparison process to filter a fourth set of candidate songs if the clarity value is smaller than a predetermined threshold; and an eighth code, determining at least one final candidate song from the fourth set of candidate songs.

Methods and apparatus of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for melody recognition, comprising:
   receiving, by a receiver, a melody;
   obtaining, by a processor, pitch tracking information of the melody;
   obtaining, by the processor, beat information of the melody;
   determining, by the processor, a clarity value of the melody according to the pitch tracking information;
   implementing, by a comparator, a first comparison process first to filter a first set of candidate songs from a database and then implementing, by the comparator, a second comparison process to filter a second set of candidate songs from the first set of candidate songs if the clarity value is larger than a predetermined threshold; and
   determining, by the comparator, a set of final candidate songs from the second set of candidate songs, wherein the set of final candidate songs includes at least one final candidate song.

2. The method as claimed in claim 1, further comprising:
   implementing, by the comparator, the second comparison process first to filter a third set of candidate songs from the database and then implementing, by the comparator, the first comparison process to filter a fourth set of candidate songs from the third set of candidate songs if the clarity value is smaller than the predetermined threshold; and
   determining, by the comparator, a set of final candidate songs from the fourth set of candidate songs.

3. The method as claimed in claim 2, wherein the first comparison process is a pitch vector comparison and the second comparison process is a beat comparison.

4. The method as claimed in claim 3, further comprising:
   implementing, by the processor, a pre-process on the melody,
   wherein the pre-process includes detecting endpoints of the melody, implementing a pre-emphasis, and partitioning the melody into a plurality of audio frames.

5. The method as claimed in claim 4, further comprising:
   using, by the processor, an auto-correlation function or average magnitude difference function to obtain the pitch tracking information of each of the plurality of audio frames after implementing the pre-process;
   obtaining, by the processor, pitch value of each of the plurality of audio frames according to the pitch tracking information; and
   converting, by the processor, pitch values of the plurality of audio frames into a pitch vector of the melody.

6. The method as claimed in claim 4, further comprising:
   using, by the processor, phase deviation to detect the endpoints of the melody.

7. The method as claimed in claim 4, further comprising:
   using, by the processor, spectral flux to detect the endpoints of the melody.

8. The method as claimed in claim 5, wherein the pitch vector comparison uses linear scaling to compare the pitch vector of the melody with all pitch vector information of a pitch corpus.

9. The method as claimed in claim 3, wherein the beat comparison uses an algorithm based on dynamic programming to compare the beat information of the melody with all beat information of a beat corpus storing beat information of each song in the database.

10. The method as claimed in claim 8, wherein the pitch corpus stores the pitch vector of each song in the database.

11. The method as claimed in claim 5, wherein the clarity value is a value obtained from normalizing the pitch tracking information, and wherein the higher the clarity value is, the more accurate the pitch value is.

12. The method as claimed in claim 1, further comprising:
producing, by the comparator, a first estimating score according to the result of the first comparison process;
producing, by the comparator, a second estimating score according to the result of the second comparison process; and
producing, by the comparator, a estimating score of each of the set of final candidate songs according to the first estimating score and the second estimating score,
wherein the estimating score is a combination of the first estimating score and the second estimating score based on a weighted ratio, and
wherein if the clarity value is larger than the predetermined threshold, the weighted ratio of the first estimating score is higher than the weighted ratio of the second estimating score,
wherein if the clarity value is smaller than the predetermined threshold, the weighted ratio of the second estimating score is higher than the weighted ration of the first estimating score, and
wherein the higher the estimating score is, the higher the matching degree of a comparison process is.

13. An apparatus for melody recognition, comprising:
a receiver, receiving a melody;
a processor, obtaining pitch tracking information and beat information of the melody and determining a clarity value of the melody according to the pitch tracking information; and
a comparator, comparing the melody with a database according to the clarity value;
wherein if the clarity value is larger than a predetermined threshold, the comparator first implements a first comparison process to filter a first set of candidate songs from the database, and then the comparator implements a second comparison process to filter a second set of candidate songs from the first set of candidate songs;
wherein the comparator determines a set of final candidate songs from the second set of candidate songs.

14. The apparatus as claimed in claim 13, wherein if the clarity value is smaller than the predetermined threshold, the comparator first implements the second comparison process to filter a third set of candidate songs from the database, then the comparator implements the first comparison process to filter a fourth set of candidate songs from the third set of candidate songs, and the comparator determines a set of final candidate songs from the fourth set of candidate songs.

15. The apparatus as claimed in claim 14, wherein the first comparison process is a pitch vector comparison, and the second comparison process is a beat comparison.

16. The apparatus as claimed in claim 13, further comprising:
a display device, displaying the set of final candidate songs.

17. The apparatus as claimed in claim 16, further comprising:
an interactive device, interacting with the beat information of the melody by means of pre-set light pattern or movements of the interactive device.

18. A non-transitory machine readable storage medium comprising machine readable instructions which when loaded into and executed by an electronic apparatus having a receiver, a processor and a comparator cause the electronic apparatus to perform a method for melody recognition, wherein the method comprising:
receiving, by the receiver, a melody;
obtaining, by the processor, pitch tracking information of the melody;
obtaining, by the processor, beat information of the melody;
determining, by the processor, a clarity value of the melody according to the pitch tracking information;
implementing, by the comparator, a first comparison process first to filter a first set of candidate songs and then implementing, by the comparator, a second comparison process to filter a second set of candidate songs if the clarity value is larger than a predetermined threshold; and
determining, by the comparator, a set of final candidate songs from the second set of candidate songs.

19. The non-transitory machine readable storage medium as claimed in claim 18, wherein the method further comprising:
implementing, by the comparator, the second comparison process first to filter a third set of candidate songs and then implementing, by the comparator, the first comparison process to filter a fourth set of candidate songs if the clarity value is smaller than a predetermined threshold; and
determining, by the comparator, a set of final candidate songs from the fourth set of candidate songs.

* * * * *